United States Patent [19]

Kuma

[11] Patent Number: 5,683,532
[45] Date of Patent: Nov. 4, 1997

[54] METHOD OF MANUFACTURING AN ACTIVE SILICA GEL HONEYCOMB ADSORBING BODY USABLE IN AN ATMOSPHERE HAVING 100% RELATIVE HUMIDITY

[75] Inventor: Toshimi Kuma, Fukuoka, Japan

[73] Assignee: Kabushiki Kaisha Seibu Giken, Fukuoka-ken, Japan

[21] Appl. No.: 497,711

[22] Filed: Jun. 30, 1995

Related U.S. Application Data

[63] Continuation-in-part of Ser. No. 35,227, Mar. 22, 1993, abandoned, which is a continuation of Ser. No. 740,139, Aug. 5, 1991, abandoned.

[30] Foreign Application Priority Data

Aug. 12, 1990 [JP] Japan ................. 2-214155

[51] Int. Cl.⁶ .............. B31C 81/00; B65H 81/00; B31F 1/22; C03L 3/00
[52] U.S. Cl. .............. 156/184; 156/89; 156/208; 501/12
[58] Field of Search .............. 156/89, 208, 184; 501/12; 55/523, 524

[56] References Cited

U.S. PATENT DOCUMENTS

| | | | |
|---|---|---|---|
| 4,382,879 | 5/1983 | Funabashi et al. | 252/457 |
| 4,886,769 | 12/1989 | Kuma et al. | 502/62 |
| 4,911,775 | 3/1990 | Kuma et al. | 156/208 |
| 5,145,657 | 9/1992 | Kobayashi et al. | 423/219 |
| 5,194,414 | 3/1993 | Kuma | 502/80 |
| 5,254,195 | 10/1993 | Tseng et al. | 156/184 |
| 5,286,700 | 2/1994 | Terui et al. | 502/324 |
| 5,501,007 | 3/1996 | Kuma | 29/846 |

FOREIGN PATENT DOCUMENTS

| | | | |
|---|---|---|---|
| 55-142522 | 11/1980 | Japan | 53/28 |
| 60-175521 | 9/1985 | Japan | 53/26 |
| 63-175619 | 7/1988 | Japan | 53/26 |

*Primary Examiner*—Donald E. Czaja
*Assistant Examiner*—Jacqueline A. Ruller
*Attorney, Agent, or Firm*—Staas & Halsey

[57] ABSTRACT

An active silica gel honeycomb adsorbing body capable of adsorbing humidity and odorous components in a process air having 100% relative humidity. A single-faced corrugated sheet having a wave length of approximately 2.5–6.5 mm and a wave height of approximately 1.3–4.0 mm, a quantity of active silica gel approximately 0.5–3.0 times the weight of inorganic fiber papers and a thickness of approximately 0.1–0.3 mm is laminated to form a honeycomb structure laminated body. The honeycomb structure laminated body is impregnated with an aqueous water glass solution, and is then impregnated with acid and dried to form active silica gel having micropores and mesopores. The micropores and the mesopores have a diameter distributed in the range of not more than 200 Å and a surface area of approximately 300–600 m²/g. The active silica gel is adhered in fiber gaps and on the surface of the inorganic fiber paper.

5 Claims, 12 Drawing Sheets

METHOD OF MANUFACTURING AN ACTIVE SILICA GEL HONEYCOMB ADSORBING BODY USABLE IN AN ATMOSPHERE HAVING 100% RELATIVE HUMIDITY

This is a continuation-in-part application of U.S. Ser. No. 08/035,227 now abandoned to Toshimi Kuma filed Mar. 22, 1993, which is a continuation application of U.S. Ser. No. 07/740,139 to Toshimi Kuma, filed Aug. 5, 1991, now abandoned.

BACKGROUND OF THE INVENTION

1. Field of the Invention

The present invention relates to a method of manufacturing an active silica gel honeycomb adsorbent body for dehumidification of air or other inactive gases, or adsorption of active gases in air or other inactive gases by forming a honeycomb structure laminated body with a solid adsorbent which reversibly adsorbs and desorbs humidity or other active gases. Dehumidification and other adsorptions occur by passing process gas and reactivation gas alternately through small channels of the honeycomb structure laminated body to continuously obtain dehumidified gas such as dry air or purified air. The honeycomb adsorbing body is usable in an atmosphere having 100% relative humidity.

2. Description of the Prior Art

Manufacture of an adsorbing body for humidity exchange consisting of silica aerogel as a moisture adsorbent bonded on a matrix of inorganic fiber paper is well known.

In the prior art, a honeycomb adsorbing body is manufactured using organic fiber paper or organic adhesive as the raw material. The adsorbing body expands and contracts greatly due to heat or humidity and is not heat-resistant. Therefore, the adsorbing body immediately deteriorates due to reactivation air above 100° C. and cannot endure extended use.

Further, in the prior art in an absorbing body impregnated with an aqueous solution of a deliquescent absorbent such as lithium chloride, there is the possibility of dew forming and the absorbent being carried together with dust by the absorbing moisture in the passing gas together with dust. The prior art is therefore not able to be used for process air having a relative humidity above 75%.

In a honeycomb type rotor which adsorbs humidity or other active gases on wall surfaces having small channels forming the honeycomb, when the size of the small channels is too small, the area of wall surface contacting the passing gas is large and a high adsorption rate is obtained. Fluid resistance, however, of the gas passing through the small channels is high and a power necessary for operation becomes high. On the other hand when the size of the small channels is too large, fluid resistance of the gas passing through the small channels is low, power necessary for operation becomes low, and the area of wall surface contacting the passing gas is small. In this instance, the chance that molecules of humidity or other active gases in the passing inactive gases such as air contacting the surface of the small channels are small, and the adsorption rate becomes low. To raise the adsorption rate, it is necessary to lower the passing speed of the gas. This brings about a defect that the capacity to adsorb the active gases in the process air per unit time decreases. The size, the quantity, and the surface area of micropores of silica gel also greatly affect adsorption capacity. The present invention is provided to overcome the above-mentioned drawbacks.

SUMMARY OF THE INVENTION

It is an object of the present invention to provide a method of manufacturing an active silica gel honeycomb adsorbing body that is operable in an atmosphere having 100% humidity.

The present invention is achieved by providing a method of manufacturing an active silica gel honeycomb adsorbing body which has a high efficiency of dehumidification or adsorption of other active gases and a relatively small passing resistance of gas in small channels. The inventor tested an active silica gel honeycomb adsorbing body in a range of conditions of a rotor width, for example, the length of a small channel, of 200–600 mm, a flowing velocity of process gas and reactivation gas at an inlet of 0.5–4 m/sec., and a rotor rotation speed of 3–20 r.p.h. The conditions change depending upon the size of the small channels of the rotor, the size and the surface area of silica gel micropores and so on. An active silica gel honeycomb adsorbing body which has a high adsorbing rate for humidity, relatively little resistance to pass gases in the small channels and which can be used in an atmosphere having 100% relative humidity can be obtained by limiting a wave length of a single-faced corrugated sheet to approximately 2.5–6.5 mm, a wave height to approximately 1.3–4.0 mm, the quantity of active silica gel to approximately 0.5–3.0 times the weight of the inorganic fiber paper, a main distributing range of a micropore diameter of the produced silica gel to not more than approximately 200 Å and a specific surface area of the micropore to 300–600 $m^2$/g. The adsorbing body of the present invention can also adsorb and remove odorous materials other than moisture from an inert gas having a relative humidity of not more than 70%. The adsorbing body of the present invention is an adsorbing body obtained by synthesizing silica gel on a matrix of a honeycomb shape made of an inorganic fiber. The adsorbing body adsorbs moisture preferentially in the micropores of the silica gel and the adsorbing body adsorbs other odorous gases in the low relative humidity atmosphere. After the micropores of the adsorbing body are saturated with humidity and other active gases, the device cannot adsorb more adsorbate. Therefore, the adsorbing body of the present invention can be operated in an atmosphere having 100% relative humidity.

DESCRIPTION OF THE PREFERRED EMBODIMENTS

Figure 1:
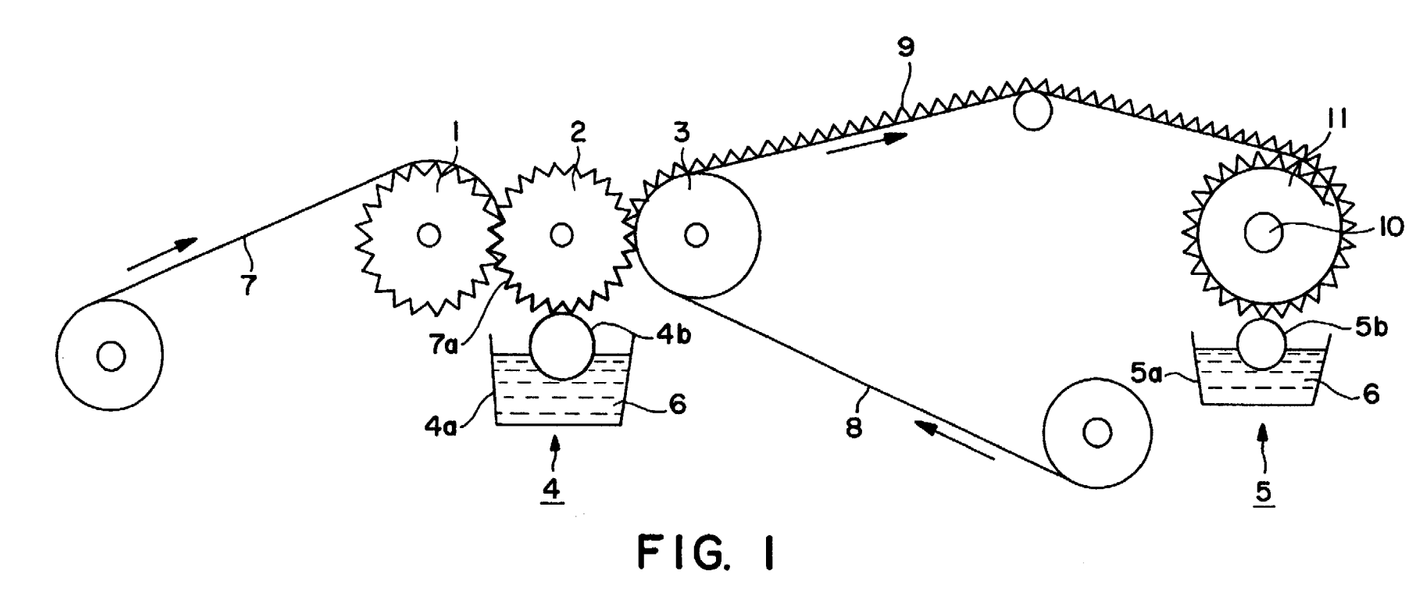
FIG. 1 is a sectional view of an apparatus employing a first process according to the present invention.

FIG. 1 is an example of equipment used in the first process, i.e., the forming process, of the present invention. In FIG. 1, 1 and 2 are a pair of forming gears with desired teeth that mesh with each other. A pressure roller 3 is urged against forming gear 2. The surface velocities of the gear 2 and the roller 3 are substantially the same. Adhesive applicators 4 and 5 include adhesive vessels 4a and 5a and adhesive applying rollers 4b and 5b, respectively. The adhesive vessels 4a and 5a contain adhesive 6 in which the adhesive applying rollers 4b and 5b are partially soaked. The adhesive applying roller 4b is mounted close to the forming gear 2.

Very porous inorganic fiber papers 7 and 8 having a width of approximately 200 mm are provided in rolls as shown in the drawing. The porous papers 7 and 8 include short ceramic fiber approximately 0.2–10 μm in diameter and approximately 70% by weight, including pulp 15% by weight and binder 15% by weight and being 0.2 mm thick with a weight of 100 g/m². The paper 7 is applied between the forming gears 1 and 2 to form a corrugated paper 7a having a wave length of approximately 3.4 mm and a wave height of approximately 1.8 mm. The corrugated paper 7a is then supplied to the engaging portion of the forming gear 2 and the adhesive applying roller 4b to apply adhesive 6 to the ridged portion of the corrugated paper 7a. The corrugated paper 7a and flat liner porous paper 8 are brought together between the forming gear 2 and the pressure roller 3 to obtain a single-faced corrugated sheet 9 by bonding the papers 7a and 8 together. Adhesive 6 is applied to a ridged portion of the single-faced corrugated sheet 9 by the adhesive applying roller 5b of the adhesive applicator 5. The single-faced corrugated sheet 9 is then rolled up around core 10 to obtain a cylindrical honeycomb structure laminated body 11 having small channels penetrating through between both end surfaces as shown in FIG. 2.

Figure 2:
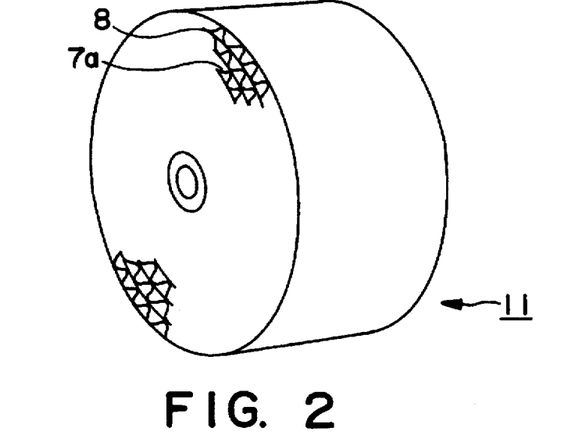
FIG. 2 is a perspective view of an active silica gel honeycomb adsorbing body obtained by the first process of the present invention.

The honeycomb structure laminated body 11 forming a honeycomb adsorbing rotor shown in FIG. 2 is fired for 5 hours in air (hot wind) having a reduced oxygen content, i.e., less than 10% oxygen, at approximately 500° C., to remove organic components contained in the paper and the adhesive so that the bulk density of the paper becomes approximately 75 g/m². The honeycomb structure is soaked in aqueous water glass (having a weight percent ratio of $SiO_2$ and $Na_2O$ of approximately 7:3) solution (having a specific gravity of approximately 1.5 at 30° C.) for full impregnation. The honeycomb structure is then dried for approximately 30 minutes by a hot air wind of approximately 60° C. to convert the water glass to hydrated water glass having a water content of 12%. The amount of water glass bound to the inorganic fiber paper after drying is approximately 0.9–2.8 times the weight of the inorganic fiber paper. The water glass is dried to such an extent that the water glass is solidified and cannot be dissolved in an acid (a reaction liquid such as sulfuric acid, hydrochloric acid and phosphoric acid) used to soak the laminated body in the next process. If the drying is insufficient, the speed of dissolution of water glass becomes faster than the speed of the reaction of water glass and acid, and the water glass changes to silica gel in the reaction liquid, i.e., acid. This silica gel does not contribute to the adsorption. This means the amount of silica gel bound to the inorganic fiber paper decreases remarkably. Table 1 shows the conditions of drying the water glass versus the amount of silica gel.

TABLE 1

|  | A | B | C |
| --- | --- | --- | --- |
| Conditions of drying water glass | 30° C., 30 minutes | 60° C., 30 minutes | 70° C. 1 hour |
| amount of water glass impregnated in inorganic fiber paper (rate) | 100% (water content 35%) | 100% (water content 12%) | 100% (water content 6%) |
| amount of silica gel produced by the treatment with acid in the inorganic fiber paper | 26.0% | 40.0% | 42.5% |

Figure 9:
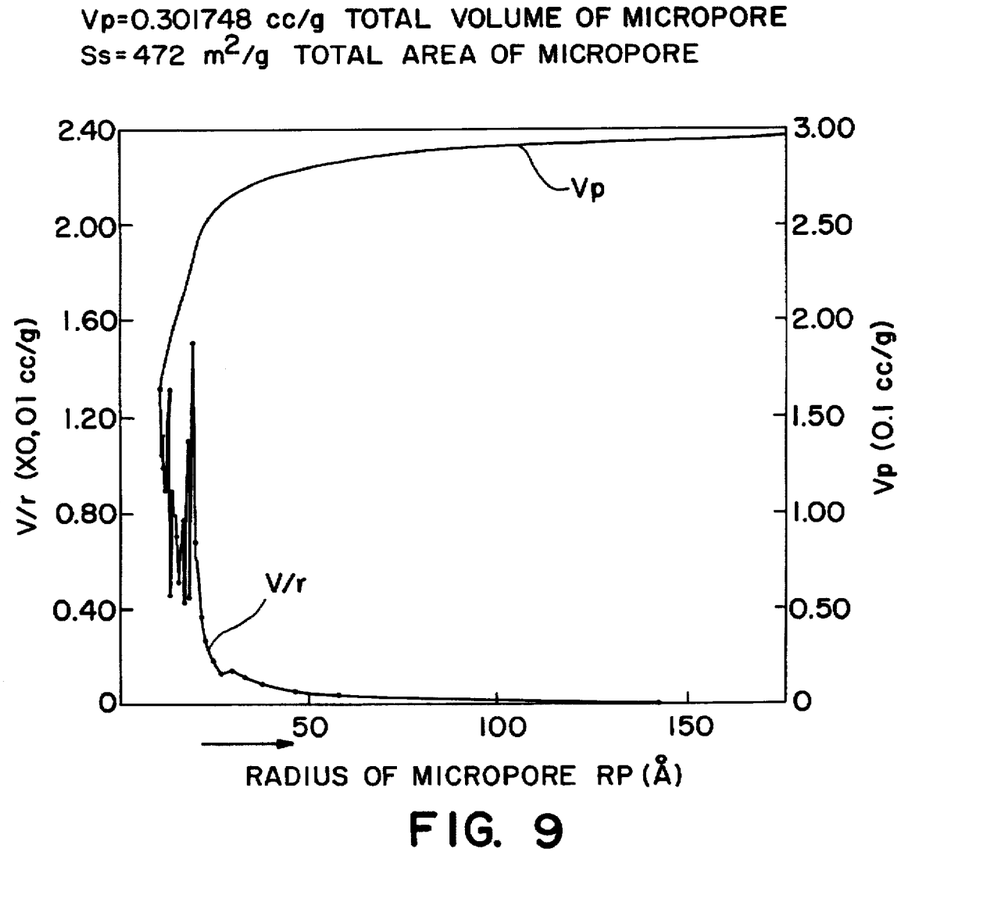
FIGS. 9, 10 and 11 are graphs showing diameter distribution and volume of mesopores, obtained under various conditions, in active silica gel of the active silica gel honeycomb adsorbing body obtained by the process of the present invention.

The honeycomb structure is then soaked for 3 hours in a 10% aqueous solution of sulfuric acid (concentration of hydrogen ions: 2.14 mol/liter) at 50° C. A silica hydrogel is produced and combined in ceramic fiber gaps by the reaction of The honeycomb structure is then washed and dried to obtain an active silica gel honeycomb adsorbing body including mainly active silica gel having a matrix of inorganic fiber paper. A liquid, preferably a warm liquid, having a temperature in which the byproduct salt, e.g., sodium sulphate, is easily dissolved, such as water having a temperature of 50°–90° C., is used as the washing liquid. When the chemical reaction is performed under the above-mentioned conditions, micropore diameters of the active silica gel in the honeycomb structure which are chemically synthesized are distributed mainly in a range of less than approximately 200 Å and having a surface area of 472 m²/g (as shown in FIG. 9). The ratio of the weight of silica gel synthesized and bound to the inorganic fiber paper after firing was 40% as shown in Column B of TABLE 1. The concentration of the acid used is important. As the soaking acid, an acid of hydrogen ion concentration of approximately 0.62–7.4 mol/liter is used. When the concentration of the soaking acid is too high, resulting gels have higher specific surface area (m²/g), smaller pore diameters and smaller pore volume (cc/g). Therefore, the moisture adsorbing capacity decreases. Furthermore, the single-faced corrugated sheet 9 of the honeycomb adsorbing rotor 11 is deformed and cracks grow on its surface, and a satisfactory product cannot be obtained.

Figure 3:
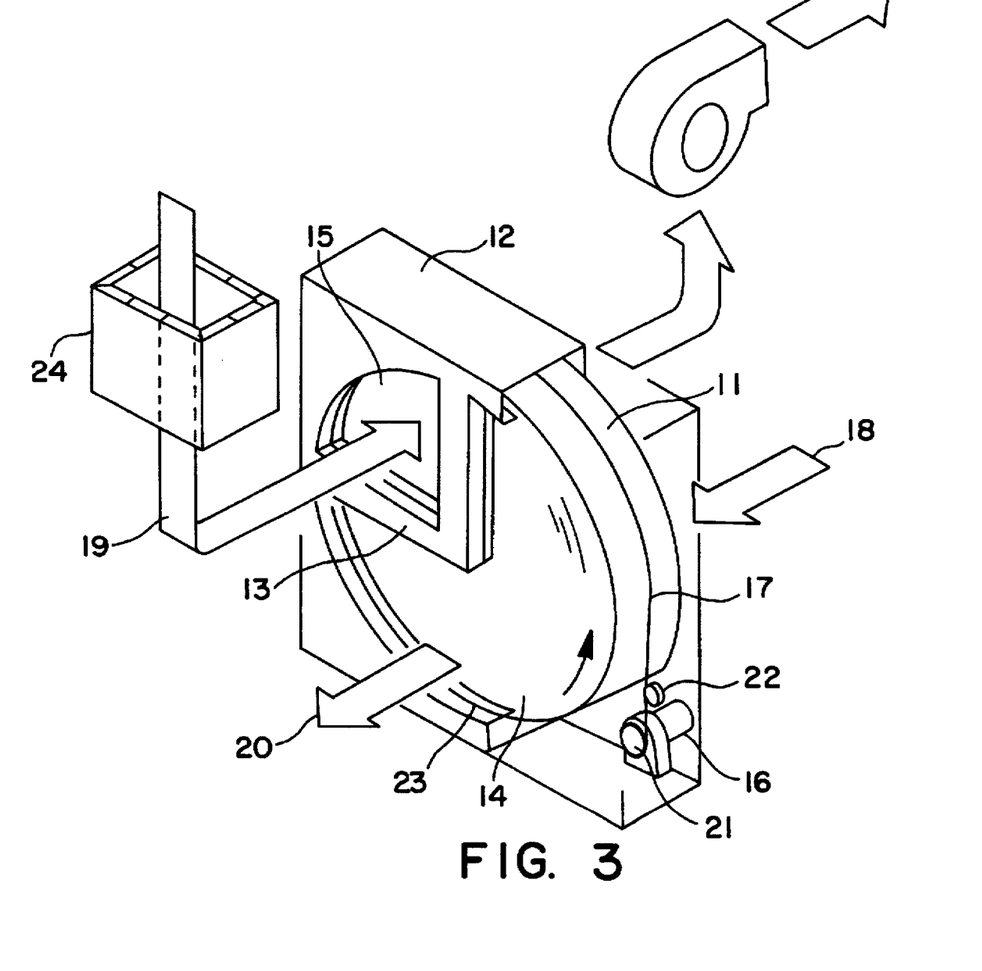
FIG. 3 is a partial cutaway perspective view of a dehumidifier constructed using the honeycomb adsorbing body of FIG. 2.

FIG. 3 is a dehumidifier constructed using the honeycomb adsorbing rotor 11. The honeycomb adsorbing rotor 11 is held rotatably in a casing 12 and is divided by a separator 13 into a process zone 14 and a reactivation zone 15. The rotor 11 is rotated by a geared motor 16 and a drive belt 17. Highly humid process air 18 is sent into the process zone 14 and hot reactivation air 19 is sent into the reactivation zone 15 to dehumidify the process air 18 to obtain dry air 20. In the drawing, 21 is a pulley, 22 is a tension pulley, 23 is a rubber seal, and 24 is a reactivation air heater.

The following Table 2 is a compilation of data from a rotor obtained by using a 15% aqueous solution of sulfuric acid, hydrochloric acid and phosphoric acid having a hydrogen ion concentrate of 3.36 mol/liter, and an aqueous solution of No. 1 water glass (having a specific gravity of 1.5) according to the example mentioned above and by producing silica gel bound to ceramic fiber paper having a 0.2 mm thickness and a weight of 75 g/m$^2$ after firing (100 g/m$^2$ before firing).

TABLE 2

| Acid | Sulfuric Acid | Phosphoric Acid | Hydrochloric Acid |
|---|---|---|---|
| Weight (per unit area) of the Sheet after Production of Silica (g/m$^2$) | 160 | 208 | 208 |
| Amount of Adhered Silica Gel (%) | 88 | 142.2 | 142.2 |
| Micropore Diameter (Å) | 7–200 | 25–45 | 25–50 |
| Micropore Surface Area (m$^2$/g) | 472 | 456 | 378 |

Figure 4:
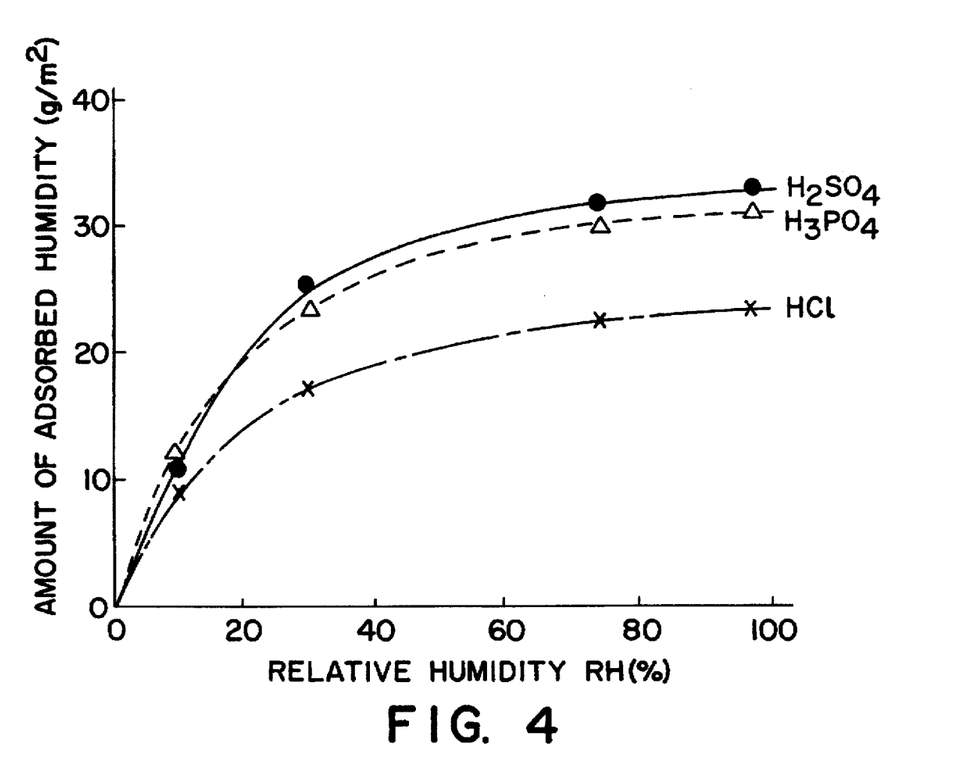
FIG. 4 is a graph showing capacities of an active silica gel honeycomb adsorbing body obtained by the process of the present invention.

FIG. 4 is a graph of the equilibrium humidity adsorbing amount per unit surface area (g/m$^2$) of the sheet 7a or 8 forming the rotor 11. The temperature during the adsorption test is 20°±2° C.

Figure 5:
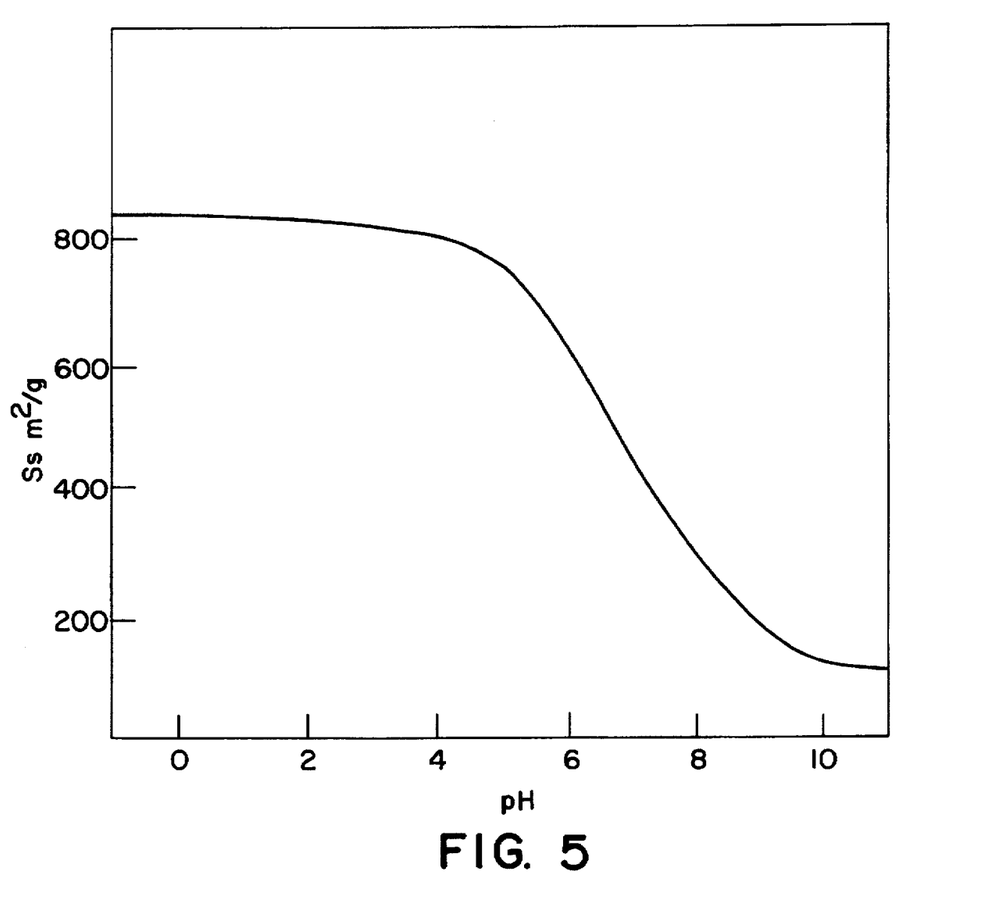
FIG. 5 is a graph showing a change of the concentration of sulfuric acid versus the change in the specific surface area of the micropore in silica gel by the reaction of water glass and sulfuric acid.

FIG. 5 shows specific surface areas Ss (m$^2$/g) of the silica gel when the silica gel is produced in accordance with the preferred embodiment using sulphuric acid, the pH range of the mixed liquid being 0–10. It can be seen that the silica gel with micropores having a satisfactorily large specific surface area is obtained when the hydrogen ion concentration of the mixed liquid is more than approximately 0.62 mol/liter.

Figure 6:
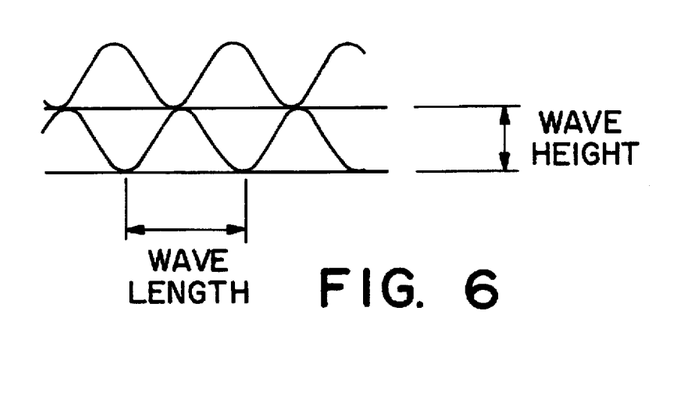
FIG. 6 is a sectional view of a part of a single-faced corrugated sheet.
Figure 7:
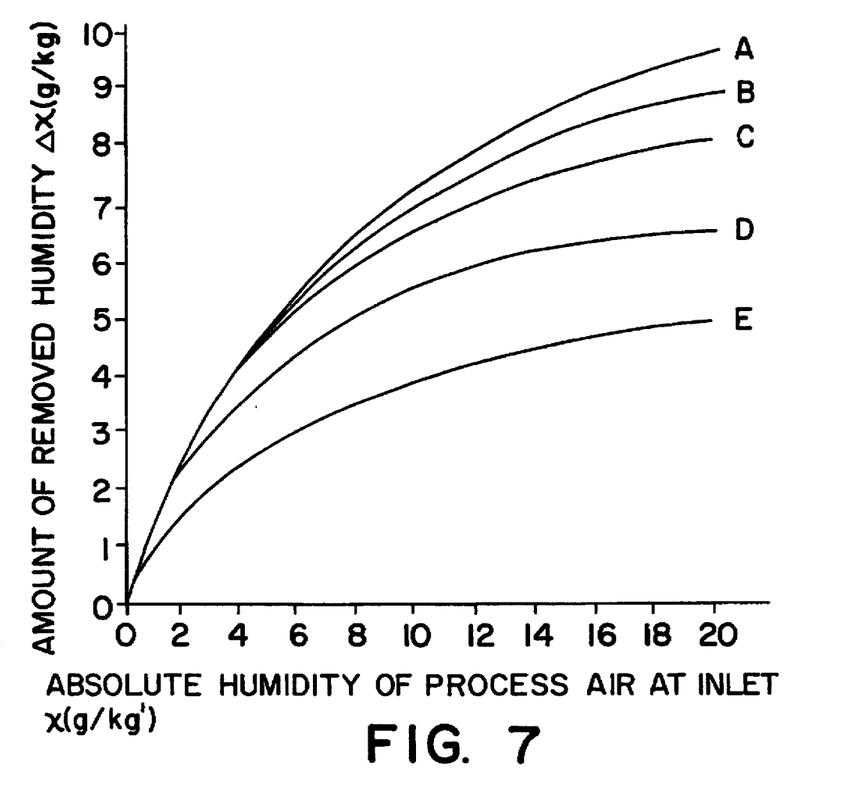
FIG. 7 is a graph of the humidity of process air versus the amount of humidity removed by an active silica gel honeycomb adsorbing body obtained by the process of the present invention.

FIG. 7 is a graph of the dehumidification capacity of a dehumidifier shown in FIG. 3 constructed using an adsorbing rotor 11 manufactured using inorganic fiber paper having a weight of 75 g/m$^2$ after firing and a 0.20 mm thickness. The rotor diameter is 320 mm, and the rotor width, i.e., length of the small channels, is 200 min. The wave length and wave height of the corrugated sheet 7a are as shown in FIG. 6. Table 3 shows wavelength and wave height of the various honeycomb structures shown in the graph of FIG. 7.

TABLE 3

| | Wave Length (mm) | Wave Height (mm) |
|---|---|---|
| A | 2.0 | 1.0 |
| B | 2.5 | 1.3 |
| C | 3.5 | 1.9 |
| D | 4.5 | 2.5 |
| E | 5.0 | 2.8 |

In Table 3 and FIG. 7, a No. 1 water glass aqueous solution (having a specific gravity of 1.5) and a 10% sulfuric acid aqueous solution (hydrogen ion concentration: 2.14 mol/liter, at a temperature of 30° C.) are used. The remaining conditions are the same as those set forth with respect to the preferred embodiment. The other conditions are as follows: wind velocity of the process air 18 and reactivation air 19 at each inlet is 2.0 m/sec., respectively, the ratio of reactivation air volume and process air volume is 1:3, the rotor rotation speed is 18 r.p.h., the temperature of process air at the inlet is 25° C., the absolute humidity of the process air at the inlet is 4–19 g/kg', the temperature of the reactivation air at the inlet is 140° C., and the absolute humidity of reactivation air at the inlet is the same as that of process air at the inlet.

In FIG. 7, the abscissa shows the absolute humidity (g/kg') of the process air at the inlet and the ordinate shows the amount of removed humidity $A_x$ (g/kg) per amount of process air. It can be seen from FIG. 7 that a satisfactory dehumidification capacity for a dehumidifier can be obtained when the wave length and wave height of the corrugated sheet are not more than 4.5 mm and 2.5 mm (D in FIG. 7), respectively.

Figure 8:
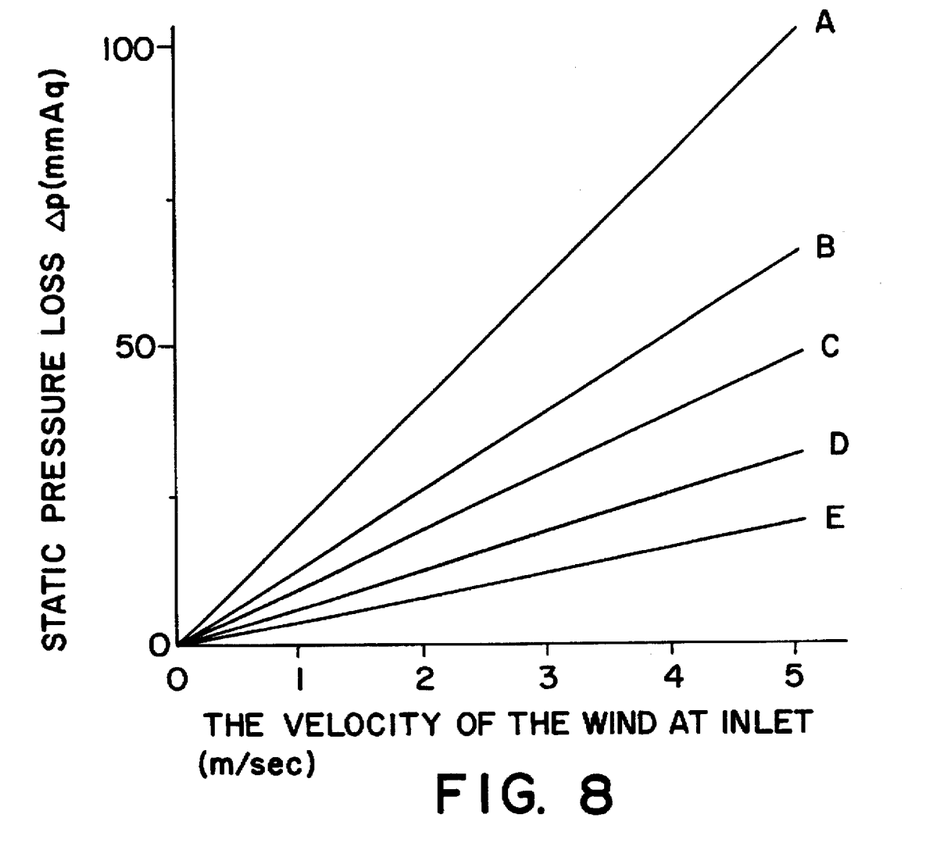
FIG. 8 is a graph of the velocity of wind at an inlet versus static pressure loss in the active silica gel honeycomb adsorbing body obtained by the process of the present invention.

FIG. 8 is a graph of a pressure loss ΔP (mmAq) when wind velocity of the process air and the reactivation air at the element inlet is 0.5–3 m/sec. and the rest of the conditions are the same as set forth above. In FIG. 8, the abscissa shows the wind velocity (m/sec.) of process air and reactivation air at the inlet and the ordinate shows pressure loss Δp (mmAq). When a wave length is less than approximately 2.5 mm, for example, 2.0 mm, and the wave height is less than 1.3 mm, for example, 1.0 mm (A in FIG. 8), pressure loss increases and the power cost for the dehumidifying operation greatly increases. Therefore, it can be seen that the range where the wave length and wave height of the single-faced corrugated sheet are approximately 2.5–4.5 mm and 1.3–2.5 mm, respectively, the main distribution range of silica aerogel micropore (micropore and mesopore) diameter is 7–200 Å, and the specific surface area of the micropore is 300–600 m$^2$/g is where dehumidification efficiency is high without causing any manufacturing problems and where a dehumidifier can be economically operated. It can be seen that it is especially favorable that the wave length is approximately 3.5 mm and the wave height is approximately 1.9 mm from the view point of manufacture, operation cost and efficiency.

By the method described in the preferred embodiment, the adsorbing body consisting of adsorbent sheets or papers bonded with silica gel having a thickness of approximately 0.15–0.35 mm is obtained. In the adsorbent sheets or papers, the quantity of fixed silica gel is approximately 0.5–3.0 times the weight of the inorganic fiber paper. When the thickness of the adsorbent sheets or papers is too small, the amount of silica gel bonded to the unit area of paper is insufficient and the adsorbing body cannot show a sufficient adsorbing capacity. When the thickness of the adsorbent sheets or papers is too thick, the opening rate of the adsorbing body decreases and pressure loss increases. Also, deep portions of the silica gel layers do not exhibit an adsorbing performance. The depth of silica gel layers capable of displaying an adsorbing performance is approximately 0.1–0.16 mm from the surface of the silica gel layer.

Figure 13:
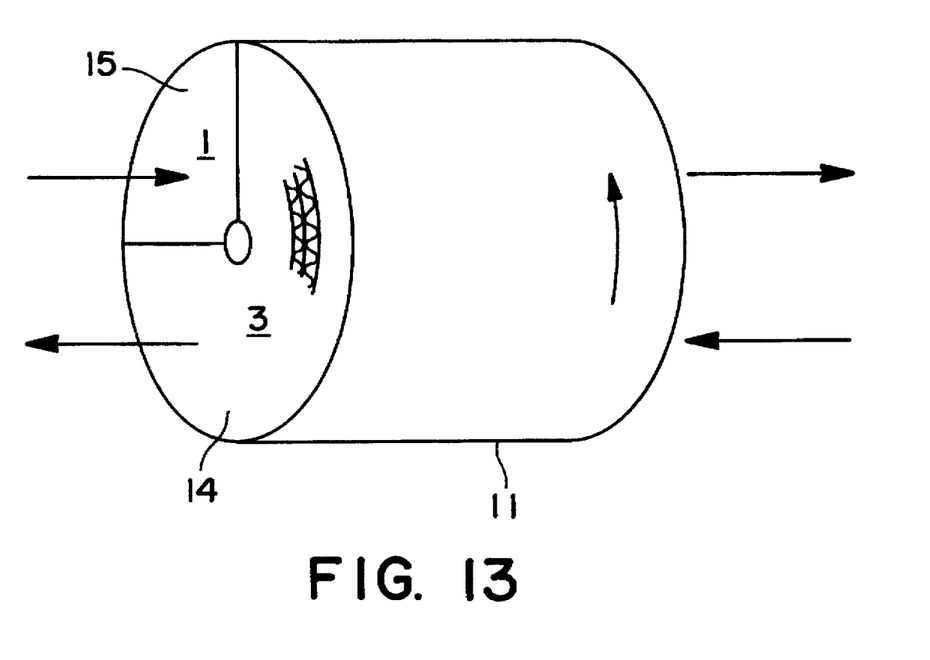
FIG. 13 is a perspective view of how to use an active silica gel honeycomb adsorbing body obtained by the process of the present invention.

A representative example of use of the active silica gel honeycomb adsorbing body obtained by the present invention is, as shown in FIG. 13, as a rotor, to send a highly humid process air and a hot reactivation air alternately to dehumidify the process air to continuously obtain dry air.

When the rotating speed of the rotor is 10 r.p.h., and the ratio of the areas of the reactivation zone 15 and the process zone 14 is 1:3, the time it takes to pass the reactivation air during one rotation of the rotor is 1.5 minutes and the time it takes to pass the process air during one rotation of the rotor is 4.5 minutes. In this system the factor for controlling the dehumidifying efficiency of the rotor is a short time for humidity adsorption. That is, a humidity adsorbing speed which is, for example, the above-mentioned 4.5 minutes.

Figure 14:
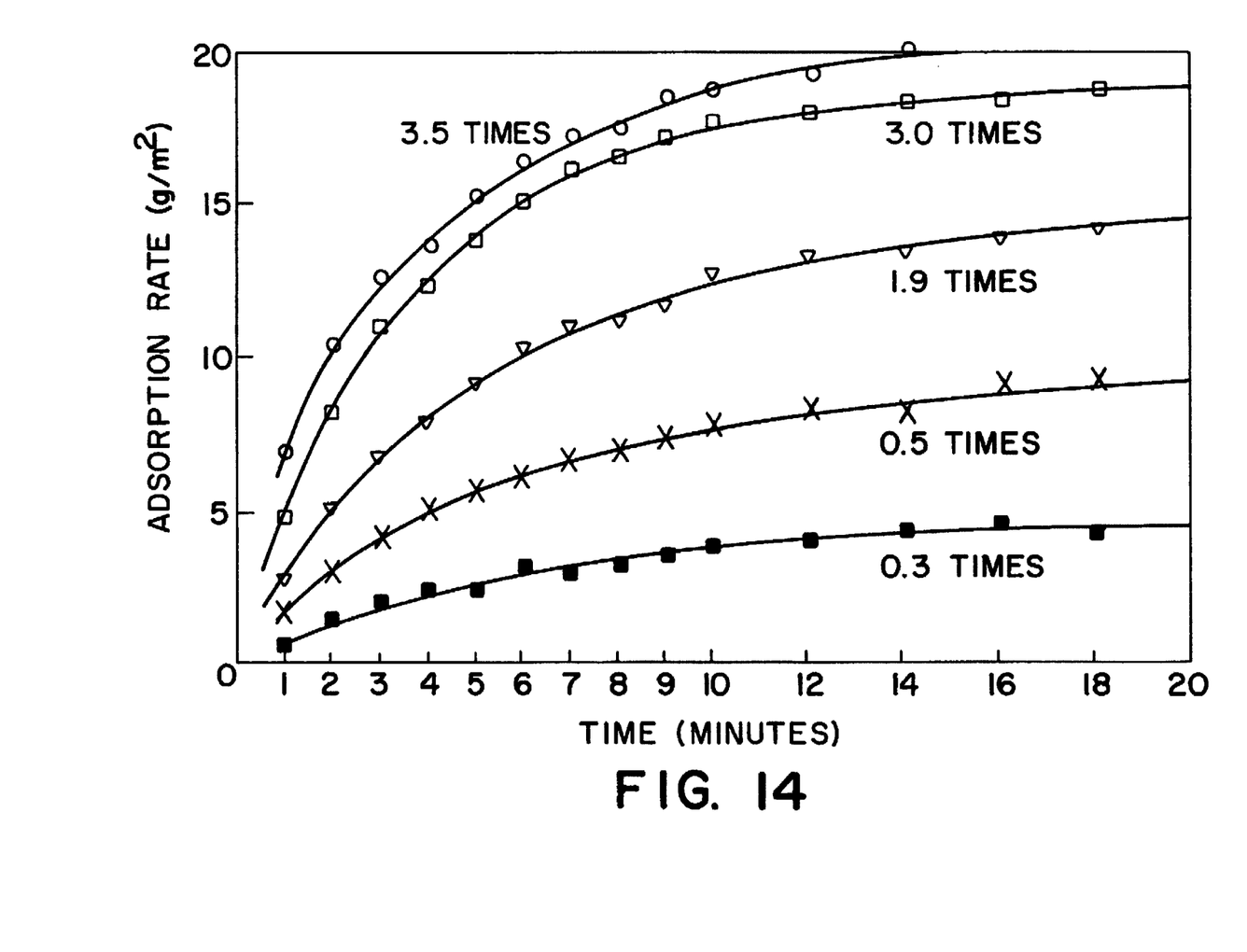
FIG. 14 is a graph of the ratio of fixed active silica gel versus speed of humidity adsorption of the active silica gel honeycomb adsorbing body obtained by the process of the present invention.

FIG. 14 is a graph of the humidity adsorbing rate (g/m$^2$) at each unit time, that is, the change of the adsorbed quantity of humidity per adsorbing unit area of the adsorbing sheet forming the honeycomb adsorbing body. The honeycomb structure laminated body having a wavelength of 3.4 mm and a wave height of 1.8 mm (see FIG. 6) composed of an inorganic fiber paper having a thickness of 0.2 mm and a weight of 80 g/m$^2$ was formed. Five active silica gel honeycomb adsorbing bodies were obtained by fixing various amounts of silica gel by chemical synthesization. Table 4 shows the amounts as follows:

TABLE 4

| | | | | | |
|---|---|---|---|---|---|
| Weight of active silica gel vs. area of the inorganic fiber paper (g/m$^2$) | 24 | 140 | 152 | 200 | 280 |
| Weight of active silica gel vs. weight of the inorganic fiber paper (g/g) | 0.3 | 0.5 | 1.9 | 3.0 | 3.5 |
| Thickness of the sheet after bonding the active silica gel (mm) | 0.20 | 0.22 | 0.25 | 0.31 | 0.39 |

The five honeycomb adsorbing bodies were operated to dehumidify air for 20 minutes as shown in FIG. 13, but the honeycomb adsorbing bodies were stationary and not rotated.

As shown in FIG. 14, a small adsorbing ratio could be obtained when the honeycomb adsorbing body, having a fixed amount of active silica gel 0.3 times the weight of the inorganic fiber paper, was operated for 4–5 minutes. This is because the amount of fixed active silica gel was small and the silica gel was saturated in a short time. When the fixed amounts of active silica gel were 0.5 times to 3.0 times the weight of the inorganic fiber paper, satisfactory adsorbing ratios were obtained by dehumidifying operations of 4–5 minutes. When the fixed amount of active silica gel was 3.5 times the weight of the inorganic fiber paper, the adsorbing ratio increased a little. This is because the thickness of the fixed active silica gel increased and the active silica gel in the inner layer could not work. When the amount of the active silica gel fixed on the paper is too large and the adsorbent sheet is too thick, the heat necessary for reactivation increases and the pressure loss increases as mentioned above, which results in disadvantages with respect to operation cost.

The active silica gel honeycomb adsorbing body of the present invention, which has a high adsorbing capacity, is manufactured as mentioned above by forming the extremely porous papers 7 and 8 having a weight of 30–250 g/m$^2$ comprising mainly a heat-resistant inorganic fiber selected from the group consisting of ceramic fiber, glass fiber, carbon fiber and a mixture thereof, into a honeycomb structure. The honeycomb structure is then fired at a high temperature (300°–700° C.) to make the paper more porous by completely removing organic components in the paper and synthesizing active silica aerogel and simultaneously combining the aerogel in the paper. Therefore, the resulting paper of the present invention has an excellent heat- and humidity-resistance with no possibility of deteriorating when heated or humidified, for example, when it is exposed to temperatures of approximately 300° C. for extended periods of time. Also, the heat expansion coefficient of the paper is small and there is no possibility of deteriorating mechanical strength even when repeatedly heated and cooled. The fiber or the active silica gel has no possibility of being scattered with gas that passes through the small channels as is common with asbestos fibers in the prior art which may be scattered with the gas to cause environmental contamination.

The active silica gel in the adsorbing body produced by the present invention, once its micropores and mesopores are saturated with adsorbed material, for example, with moisture, does not adsorb any further moisture and does not produce water drops due to dew condensation. Thus, the adsorbing body of the present invention can be used with confidence even in air having 100% relative humidity. It can also tightly hold a sufficient amount of active silica gel for extended periods of time in fiber gaps and on the paper surface while maintaining its structural form.

Figure 10:
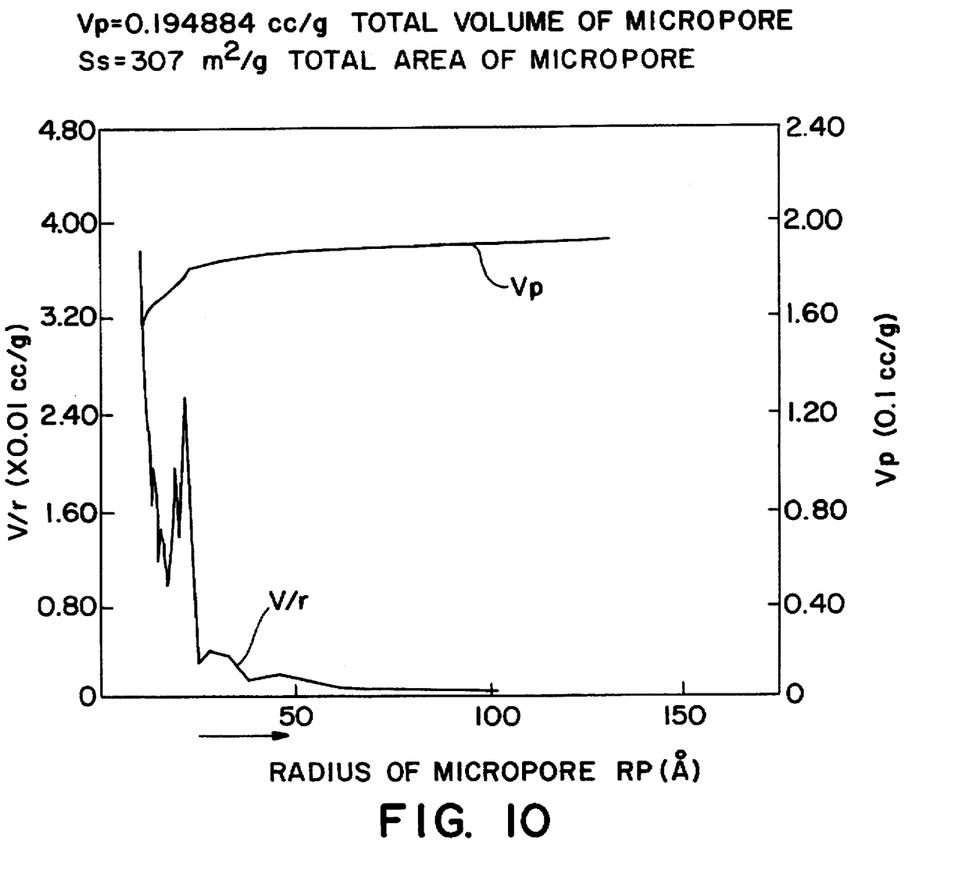
Figure 11:
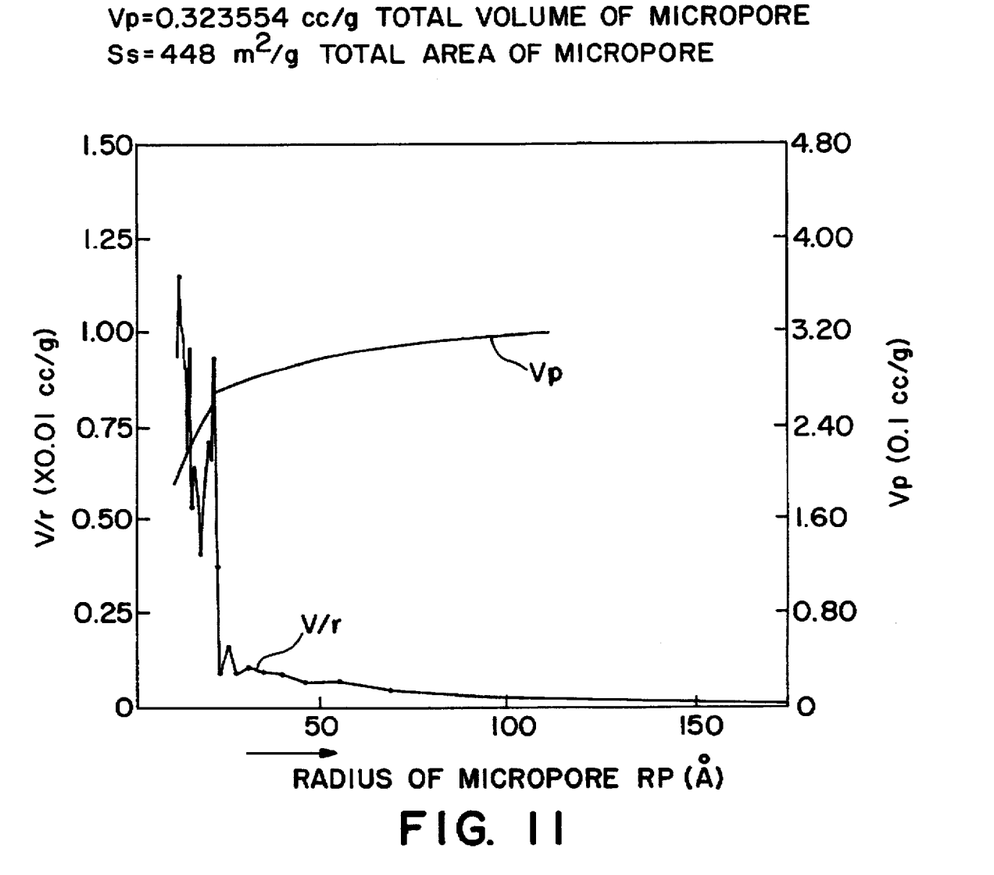
Figure 12:
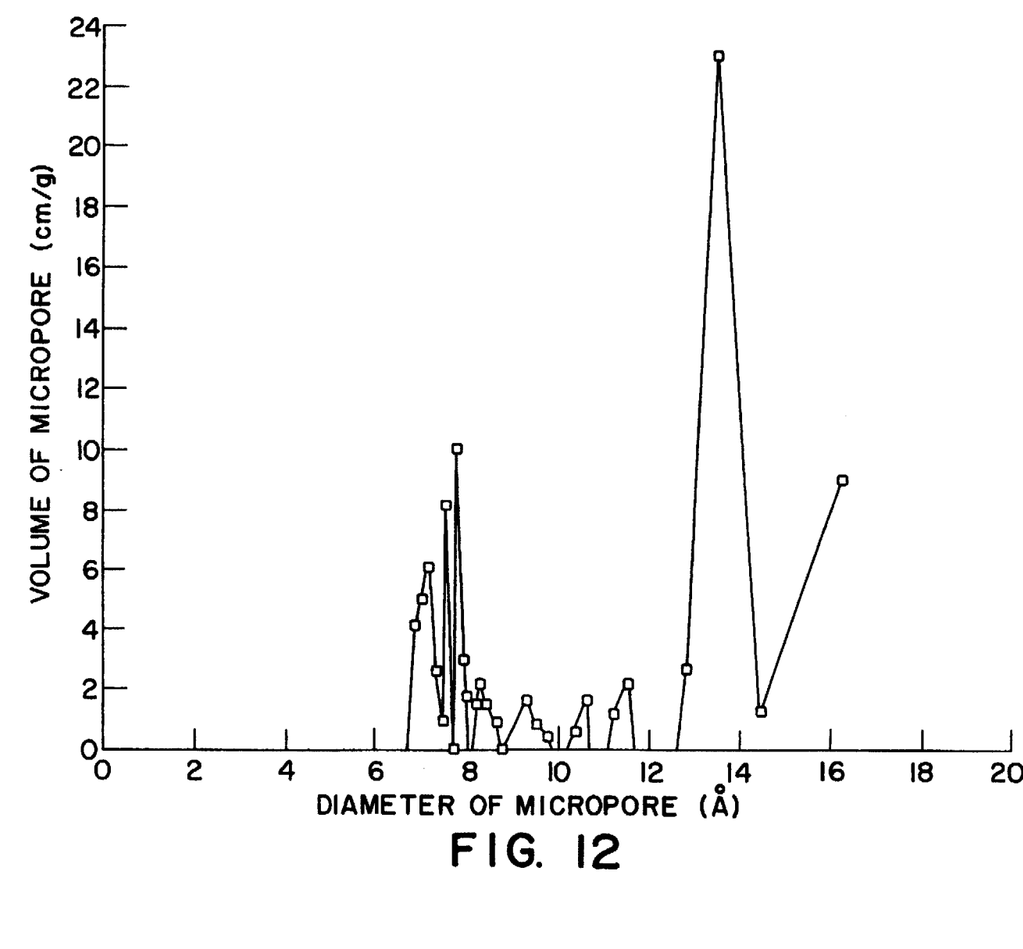
FIG. 12 is a graph showing the diameter distribution of the micropores in active silica gel of the active silica gel honeycomb adsorbing body obtained by the process of the present invention.

FIGS. 9, 10 and 11 are graphs of diameter distributions of micropores in the active silica gel in the rotor 11 under the conditions shown in Table 2, i.e., a differential volume v/r (micropore volume (×0.01 cc/g) per each micropore radius (Å)) and a micropore volume, (integral volume VP (×0.1 cc/g)) measured by "SORPTOMATIC SERIES 1800" manufactured by Carlo Erba. It is recommended to call the micropores, whose diameter is in the range of 20–500 Å, "mesopores" as stated in IUPAC Manual of Symbols and Terminology, Appendix 2, Pt. 1, Colloid and Surface Chemistry, Pure and Applied Chem., 31, 578 (1972). In the drawings, the diameter distribution in a range less than a diameter of 20 Å, i.e., a range less than a radius of 10 Å, is not measured. As for the micropores having a radius in the range less than 10 Å, FIG. 12 shows an example of data regarding the diameter distribution of micropores measured by ASAP 2000 manufactured by Micromeritics Instrument corporation, U.S.A. It can be seen in the drawings that many pores are distributed in the range of the micropores. As shown in FIGS. 9–12, micropores having a diameter less than approximately 200 Å are produced and distributed. The total surface area is approximately 300–536 m$^2$/g measured by a BET measurement. Thus, the rotor 11 has extremely excellent characteristics and can strongly adsorb water molecules and easily desorb them by heating. It can also adsorb odorous gases in the atmosphere having a relative humidity less than 70%.

The present invention includes paper material prepared having a thickness of approximately 0.1–0.3 mm, a wave length and wave height of a single-faced corrugated sheet of approximately 2.5–6.5 mm and approximately 1.3–4.0 mm, respectively, laminated and formed into a honeycomb structure. The developed surface area (the total obverse and reverse areas) of the formed rotor is approximately 1500–4000 m$^2$/m$^3$. Thus, the present invention has an effect that when a humidity-containing gas, for example, air, is input into small channels of the active silica gel honeycomb adsorbing body of the present invention, the gas fully contacts the adsorbing body that forms a small channel wall and humidity in the gas is adsorbed by the large effective surface of the adsorbing body. The present invention also has an effect that dehumidified air or other gas can be surely obtained with low operation cost since pressure loss is comparatively little when wind velocity at the rotor inlet is in the range of 0.5–5 m/sec.

The foregoing is considered illustrative of the principles of the present invention. Since numerous modifications and changes will readily occur to those skilled in the art, it is not desired to limit the invention to the exact construction and application shown and described, and accordingly, all suitable modifications and equivalents may be resorted to, falling within the scope of the invention and the appended claims and their equivalents.

What is claimed is:

1. A method of manufacturing an active silica gel honeycomb adsorbing body capable of adsorbing humidity and odorous components in a process air having 100% relative humidity, comprising the steps of:
   a) laminating a corrugated paper and a flat liner paper, both being low density inorganic fiber papers having a weight of approximately 30–250 g/m$^2$ and a thickness of approximately 0.1–0.3 mm, said corrugated paper having a wavelength of approximately 2.5–6.5 mm and a wave height of approximately 1.3–4.0 mm to form a single-faced corrugated sheet;
   b) rolling up said single-faced corrugated sheet into a cylindrical honeycomb structure laminated body;
   c) impregnating said cylindrical honeycomb structure laminated body with an aqueous water glass solution;
   d) drying the impregnated cylindrical honeycomb structure laminated body, the quantity of the water glass impregnated in said cylindrical honeycomb structure laminated body after drying being approximately 0.9–2.8 times the weight of said cylindrical honeycomb structure laminated body, and the water glass being solidified until the water glass becomes insoluble in an acid used in step e);
   e) soaking said cylindrical honeycomb structure laminated body in an acid having a hydrogen ion concentration of approximately 0.62–7.4 mol/liter to chemically synthesize and bind active silica gel in fiber gaps and on surfaces of the inorganic fiber papers of the cylindrical honeycomb structure laminated body by a chemical reaction of the water glass and the acid, the active silica gel having micropores and mesopores having a diameter less than approximately 200 Å and having a specific surface area approximately 300–600 m$^2$/g; followed by
   f) washing the cylindrical honeycomb structure laminated body with a liquid which can easily dissolve a salt produced as a byproduct of the chemical reaction; then
   g) drying the cylindrical honeycomb structure laminated body to obtain an adsorbing body mainly comprising active silica gel, the thickness of the inorganic fiber paper bound with the active silica gel being in the range of 0.15–0.35 mm, and the quantity by weight of the active silica gel being approximately 0.5–3.0 times the weight of the inorganic fiber paper.

2. A method of manufacturing an active silica gel honeycomb adsorbing body capable of adsorbing humidity and odorous components in a process air having 100% relative humidity according to claim 1, wherein in said step (e) the cylindrical honeycomb structure laminated body is washed with liquid having a temperature not lower than 50° C. to remove salt produced as a byproduct of the chemical reaction.

3. A method of manufacturing an active silica gel honeycomb adsorbing body capable of adsorbing humidity and odorous components in a process air having 100% relative humidity according to claim 1, wherein in said step (a), the inorganic fiber paper comprises fiber or fibers selected from the group consisting of ceramic fiber, glass fiber, carbon fiber and a mixture thereof.

4. A method of manufacturing an active silica gel honeycomb adsorbing body capable of adsorbing humidity and odorous components in a process air having 100% relative humidity according to claim 1, further comprising, before said step (b), the substep of firing the cylindrical honeycomb structure laminated body with air having a reduced content of oxygen before it is impregnated with the aqueous water glass solution.

5. A method of manufacturing an active silica gel honeycomb adsorbing body capable of adsorbing humidity and odorous components in a process air having 100% relative humidity according to claim 1, wherein said step (d) comprises soaking the cylindrical honeycomb structure laminated body in an acid selected from the group consisting of sulfuric acid, hydrochloric acid and phosphoric acid.

* * * * *

UNITED STATES PATENT AND TRADEMARK OFFICE
CERTIFICATE OF CORRECTION

PATENT NO. : 5,683,532

DATED : November 4, 1997

INVENTOR(S) : Kuma

It is certified that error appears in the above-identified patent and that said Letters Patent is hereby corrected as shown below:

Column 4, line 50, change "byproduct" to --by-product--.

Column 10, line 3, change "byproduct" to --by-product--.

line 16, change "byproduct" to --by-product--.

Signed and Sealed this

Twenty-fourth Day of March, 1998

Attest:

BRUCE LEHMAN

*Attesting Officer*  *Commissioner of Patents and Trademarks*